United States Patent [19]

Feeney

[11] 4,434,271

[45] Feb. 28, 1984

[54] GLASS FILLED POLY(P-METHYLSTYRENE)

[75] Inventor: Frank J. Feeney, East Windsor, N.J.

[73] Assignee: Mobil Oil Corporation, New York, N.Y.

[21] Appl. No.: 407,986

[22] Filed: Aug. 13, 1982

Related U.S. Application Data

[63] Continuation of Ser. No. 230,190, Feb. 2, 1981, abandoned.

[51] Int. Cl.$^3$ ............................ C08K 7/14; C08K 3/40
[52] U.S. Cl. .................................... 524/575; 524/577; 524/494
[58] Field of Search ...................... 524/577, 575, 494; 526/347.1

[56] References Cited

U.S. PATENT DOCUMENTS

| | | | |
|---|---|---|---|
| 3,842,029 | 10/1974 | Saito et al. | 524/505 |
| 3,931,094 | 1/1976 | Segal et al. | 524/430 |
| 4,104,334 | 8/1978 | Snavely | 525/194 |
| 4,212,697 | 7/1980 | Yamamoto et al. | 264/128 |
| 4,230,836 | 10/1980 | Canterino | 525/332 |
| 4,362,854 | 12/1982 | Prapas | 524/855 |

FOREIGN PATENT DOCUMENTS 35321 9/1981 European Pat. Off. ............ 524/577
1457205 12/1976 United Kingdom .

OTHER PUBLICATIONS

Chem. Abs. 82-99378 (1975), Nakanishi et al., "Mixture of Glass Fiber & Thermoplastic Resin".
Derwent Abst. 81735/Y/46 (J52117737) Mitsui Toatsu, 10/3/77.
Derwent Abst. 75316 Y/42 (J52108475) Mitsubishi, 9/10/77.
Derwent Abst. 85309 Y/48 (J52123982) Toray Inds. KK 10/18/77.
Derwent Abst. 83597 Y/47 (J52120986) TorayInds KK 10/11/77.
Derwent Abst. 06213 C/04 (J54155267) Sumitomo Chem. 12/7/79.
Derwent Abst. 89390 C/50 (J80045576) Asahi Dow 11/18/80.

*Primary Examiner*—Herbert J. Lilling
*Attorney, Agent, or Firm*—Alexander J. McKillop; Michael G. Gilman; Edward J. Trojnar

[57] ABSTRACT

This invention provides a heat stabilized composition comprising poly(p-methylstyrene) containing between about 5 percent and about 50 percent, based upon the total weight of the composition, of short glass fibers.

2 Claims, No Drawings

GLASS FILLED POLY(P-METHYLSTYRENE)

This is a continuation of application Ser. No. 230,190, filed Feb. 2, 1981, abandoned.

BACKGROUND OF THE INVENTION

1. Field of the Invention

This invention is concerned with blends of poly(p-methylstyrene).

2. Description of the Prior Art

Insofar as is now known, the specific compositions of this invention have not been proposed.

SUMMARY OF THE INVENTION

This invention provides a heat stabilized composition comprising poly(p-methylstyrene) containing between about 5 percent and about 50 percent, based upon the total weight of the composition, of short glass fibers.

DESCRIPTION OF SPECIFIC EMBODIMENTS

The monomer used in preparing the homopolymer in accordance with this invention is p-methylstyrene. It is within the contemplation of this invention to use mixtures of methylstyrene rich in p-methylstyrene. Such mixtures contain at least about 90 weight percent, preferably 95–99 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolymers containing between about 10 and about 1 weight percent conjugated diene, such as butadiene or isoprene. The polymerization reaction is carried out by using methods and catalysts well known in the art for polymerizing styrene. The reaction can be carried out in solution, bulk, suspension, or emulsion.

The poly(p-methylstyrene) homo or co-polymer has incorporated therein a reinforcing filler. Typical fillers include silica, glass, carbon, asbestos, mica, titanium dioxide, and calcium carbonate. Preferably, the filler is in the form of fibers, such as glass, Kevlar graphite, boron, high silica, quartz, asbestos cotton, nylon, and polyester fibers.

The poly(p-methylstyrene) more preferably the incorporated therein short glass fibers between about 3/16 and about 5/16 inch in length. The glass fibers are readily available commercially and often come sized with a silane. The amount of glass fibers used will be between about 5 percent and about 50 percent, preferably between about 20 percent and about 30 percent, based upon the total weight of the composition.

Blending of the poly(p-methylstyrene) with the reinforcing fillers can be either by dry blending or by melt blending, blended in extruders, heated rolls, or other types of mixers. Other additives for appearance and property improvements can be incorporated, such as colorants, plasticizers, stabilizers, hardeners and the like.

EXAMPLES 1 and 2

Using a 1½ inch single screw (Davis Standard) extruder, poly(p-methylstyrene) was melt compounded with 10 percent and 25 percent, respectively, 3/16 inch glass fibers. The composites were then injection molded into ASTM test specimens and evaluated. Test results are set forth in the Table.

EXAMPLES 3 and 4

For comparison purposes, Examples 1 and 2 were repeated using polystyrene instead of poly(p-methylstyrene). Test results are set forth in the Table.

TABLE

| Material | Polystyrene | | Poly (PMS) | |
|---|---|---|---|---|
| % Fiberglass | 10 | 25 | 10 | 25 |
| DTUL, °C.* | 100 | 101.5 | 105.5 | 109 |
| Izod Impact, fppi | | | | |
| Dead End | .45 | .71 | .53 | .80 |
| Gate End | .57 | .78 | .60 | .86 |
| Tensile Strength, PSI | 8100 | 9840 | 8580 | 9600 |
| Tensile Elongation, % | 2.57 | 2.19 | 2.8 | 2.5 |
| Tangent Modulus ($10^5$ PSI) | 44.0 | 57.6 | 38.8 | 52.5 |
| Flexural Stiffness ($10^5$ PSI) | 6.49 | 8.70 | 5.70 | 7.89 |
| Flexural Strength ($10^3$ PSI) | 13.18 | 14.7 | 13.47 | 14.53 |

*Deflection Temperature Under Load

The glass filled compositions of this invention exhibit significantly improved distortion temperature under load (DTUL) compared to the corresponding compositions prepared with polystyrene polymers. Unexpectedly, the sensitivity to glass filling is much greater with poly (p-methylstyrene) than with polystyrene.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A heat stabilized homogeneous thermoplastic composition consisting essentially of p-methylstyrene homopolymer or copolymer containing at least 90 weight percent polymerized p-methylstyrene and 10 to 1 weight percent of a conjugated diene, in which said p-methyl styrene comprises mixtures of methyl styrenes containing at least 90 weight percent p-methylstyrene, less than 0.1 weight percent o-methylstyrene and the balance m-methylstyrene; and between about 5 percent and about 50 percent, based on the total weight of the composition, of a reinforcing filler which predominantly comprises glass fibers.

2. The composition of claim 1 in which said reinforcing filler consists of glass fibers.

* * * * *